(12) United States Patent
Kaneko et al.

(10) Patent No.: US 6,274,998 B1
(45) Date of Patent: Aug. 14, 2001

(54) CONTROLLER FOR ELECTRIC VEHICLES

(75) Inventors: Takashi Kaneko; Takeshi Ando; Akira Horie, all of Hitachinaka; Ken Itou, Mito, all of (JP)

(73) Assignee: Hiatchi, Ltd., Tokyo (JP)

( * ) Notice: Subject to any disclaimer, the term of this patent is extended or adjusted under 35 U.S.C. 154(b) by 0 days.

(21) Appl. No.: 09/508,856

(22) PCT Filed: Sep. 24, 1997

(86) PCT No.: PCT/JP97/03386

§ 371 Date: Mar. 17, 2000

§ 102(e) Date: Mar. 17, 2000

(87) PCT Pub. No.: WO99/15355

PCT Pub. Date: Apr. 1, 1999

(51) Int. Cl.[7] ................. H02P 5/34; H02P 7/42
(52) U.S. Cl. ........... 318/802; 318/798; 318/806; 180/197; 180/65.5; 303/177
(58) Field of Search .............. 318/802, 806, 318/811, 798–801, 758, 779, 367, 476; 180/197, 15, 16, 65.5; 303/3, 20, 151, 177

(56) References Cited

U.S. PATENT DOCUMENTS

| | | | | |
|---|---|---|---|---|
| 4,785,225 | * | 11/1988 | Horie et al. | 318/811 |
| 5,304,912 | * | 4/1994 | Kajiwara et al. | 318/802 |
| 5,473,225 | * | 12/1995 | Miyazaki | 318/52 |
| 5,480,220 | * | 1/1996 | Kumar | 303/151 |
| 5,511,866 | * | 4/1996 | Terada et al. | 303/152 |
| 5,532,571 | * | 7/1996 | Masaki et al. | 318/809 |
| 5,847,534 | * | 12/1998 | Tanamachi et al. | 318/201 |
| 6,152,546 | * | 11/2000 | Daigle | 303/151 |

FOREIGN PATENT DOCUMENTS

| | | | |
|---|---|---|---|
| 4-69003 | 3/1992 | (JP) . | |
| 4-197004 | 7/1992 | (JP) . | |
| 5-83976 | 4/1993 | (JP) . | |
| 08182119 | * 7/1996 | (JP) | B60L/15/20 |

* cited by examiner

*Primary Examiner*—Robert E. Nappi
*Assistant Examiner*—Edgardo San Martin
(74) *Attorney, Agent, or Firm*—Antonelli, Terry, Stout & Kraus, LLP

(57) ABSTRACT

A controller for electric vehicles comprising a vector control inverter for controlling motors, which drive wheels of the electric vehicles, by dividing the primary current of the motors into an exciting current component and a torque current component, and controlling respective of the current components based on a respectively designated command, characterized in further comprising a dectector for detecting a wheel velocity (including a rotor frequency of the motor proportional to the wheel velocity), a detector for detecting slipping and skidding of the wheel based on a differential value (a changing rate with time) of the detected wheel velocity, a dectector for detecting re-adhesion of the wheel based on the differential value and a twice differential value of the detected wheel velocity, and an adjuster for adjusting the designated command for the torque current component in response to the detectors.

11 Claims, 9 Drawing Sheets

CONTROLLER FOR ELECTRIC VEHICLES

BACKGROUND OF THE INVENTION

The present invention relates to a controller for electric vehicles driven by motors with an inverter using vector control, particularly, a controller for electric vehicles performing torque control for re-adhering by detecting slipping or skidding generated between wheels and rails.

As a prior art, a method for controlling re-adhesion by detecting slipping or skidding of wheel of electric vehicles, and reducing generated torque of motors has been disclosed in JP-A-4-197004 (1992). A method for detecting re-adhesion of wheel was disclosed in JPA-4-69003 (1992). A technique for driving motors of electric vehicles of railway by vector control of inverters was disclosed in JP-A-5-83976 (1993).

In accordance with the conventional re-adhesion controlling method disclosed in the above JP-A-4-197004 (1992), the slipping of wheel is detected by a method which recognizes whether a changing rate with time (differential value) of the rotor frequency (proportional to the wheel velocity) of the induction motor exceeds a fixed detecting level or not, and a control to reduce the motor torque is performed only during a period when the slipping is detected. However, if the differential value becomes smaller than a designated value, the recognition of the slipping is canceled, and the motor torque is controlled to resume irrelevant to whether the wheel are practically re-adhered or not. Therefore, if the wheel is not re-adhered practically, slipping the wheel occurs instantaneously, and a problem occurs that the slipping phenomena are generated very often repeatedly.

A method for controlling the torque by detecting the re-adhesion is disclosed in the above JP-A-4-69003 (1992), and the method for detecting the re-adhesion is explained hereinafter referring to FIG. 10. The re-adhesion is detected by recognizing that a twice differential value fr" (an axis jerking value) of the rotor frequency fr (proportional to the wheel velocity) at the time t2 exceeds a designated value Le, after detecting the slipping at the time t1.

However, the following problem can be anticipated with the detection of slipping using the twice differential value fr". First, if the wheel velocity behaves as shown in FIG. 11 when re-adhering, the twice differential value fr" of the wheel velocity does not exceed the designated value Le, and the re-adhesion can not be detected nevertheless the re-adhesion occurred at the time t2. Consequently, the torque is maintained in a reduced condition continuously, and a problem that the reduced acceleration of the electric vehicle is generated. Furthermore, in a case if the slipping, which has been likely to converge on an end, is re-generated at the time t1a as shown in FIG. 12, the twice differential value fr" exceeds the designated value Le at the time t1a, and a problem that the re-adhesion is erroneously detected and the slipping is continued is generated.

These kind of problems can be caused when the skidding is generated. As explained above, the conventional technology has a problem that the re-adhesion can not be detected, or the re-adhesion is detected erroneously depending on conditions of slipping or skidding.

Currently, an inverter with vector control such as disclosed in JP-A-5-83976 (1993) come to be used as a controller of induction motors for driving electric vehicles. However, any technology to utilize performance of the vector control for controlling the re-adhesion has not been disclosed.

SUMMARY OF THE INVENTION

The object of the present invention is to provide a controller for electric vehicles, which can utilize the torque effectively to the physical limit of adhesion by utilizing a fast torque response of the vector control, and can make the velocities of acceleration and deceleration of the electric vehicles as high as possible even in a condition when the adhesion coefficient is low.

The present invention relates to a controller for electric vehicles comprising a vector control inverter, which controls motors for driving wheels of the electric vehicles, by dividing the primary current of the motor into an exciting current component and a vector current component, and controlling respective of the current components based on a respectively designated command; further comprises means for detecting a wheel velocity (including rotor frequency of the motors proportional to the wheel velocity), means for detecting slipping and skidding of the wheel based on a differential value (a changing rate with time) of the detected wheel velocity, means for detecting re-adhesion of the wheel based on the detected differential value and a twice differential value of the detected wheel velocity, and means for adjusting the designated command for the torque current component in response to the above two means for detection.

In accordance with the above method of the present invention, if the differential value of the wheel velocity exceeds a designated value when the electric vehicle is accelerated, it can be regarded as slipping occurs, and the control to reduce the torque current is performed. As the result, when the slipping velocity is decreased and re-adhesion occurs, the acceleration of the wheel is resumed. The re-adhesion point can be detected as a point when the differential value of the wheel velocity becomes negative and the twice differential value becomes positive. According to the above point, it can be determined that the slipping of the wheel is certainly converging on an end, the wheel is re-adhered, and the acceleration of the wheel is resumed. The torque current is maintained in a reduced condition until the re-adhesion is detected. Therefore, even if the torque current is resumed fast after the re-adhesion occurred, a possibility to cause re-slipping can be made low by confirming the re-adhesion. Consequently, the torque can be increased fast as much as the torque current is resumed fast, and the acceleration of the electric vehicle can be increased.

Even if the slipping occurs and before the re-adhesion is detected, the slipping is converging on an end when the differential value of the wheel velocity is decreased. Consequently, the decrease of the torque can be reduced by reducing the decrease of the torque current, and the acceleration can be increased as much as reducing the decrease of the torque. If skidding occurs when the electric vehicle is decelerated, the theory is quite same except the sign of detecting level is opposite.

As explained above, if the motor for driving the wheel is vector controlled, the torque current component in the primary current of the motor can be controlled independently. The torque current control influences only to leakage impedance of the motor, and it has a feature that time constant is small and control response is fast. Accordingly, if the re-adhesion control of the present invention is performed with the vector control, the re-adhesion performance having a fast response can be naturally obtained, and the torque can be utilized effectively to the physical adhesion limit.

DETAILED DESCRIPTION OF THE PREFERRED EMBODIMENTS

Figure 1:
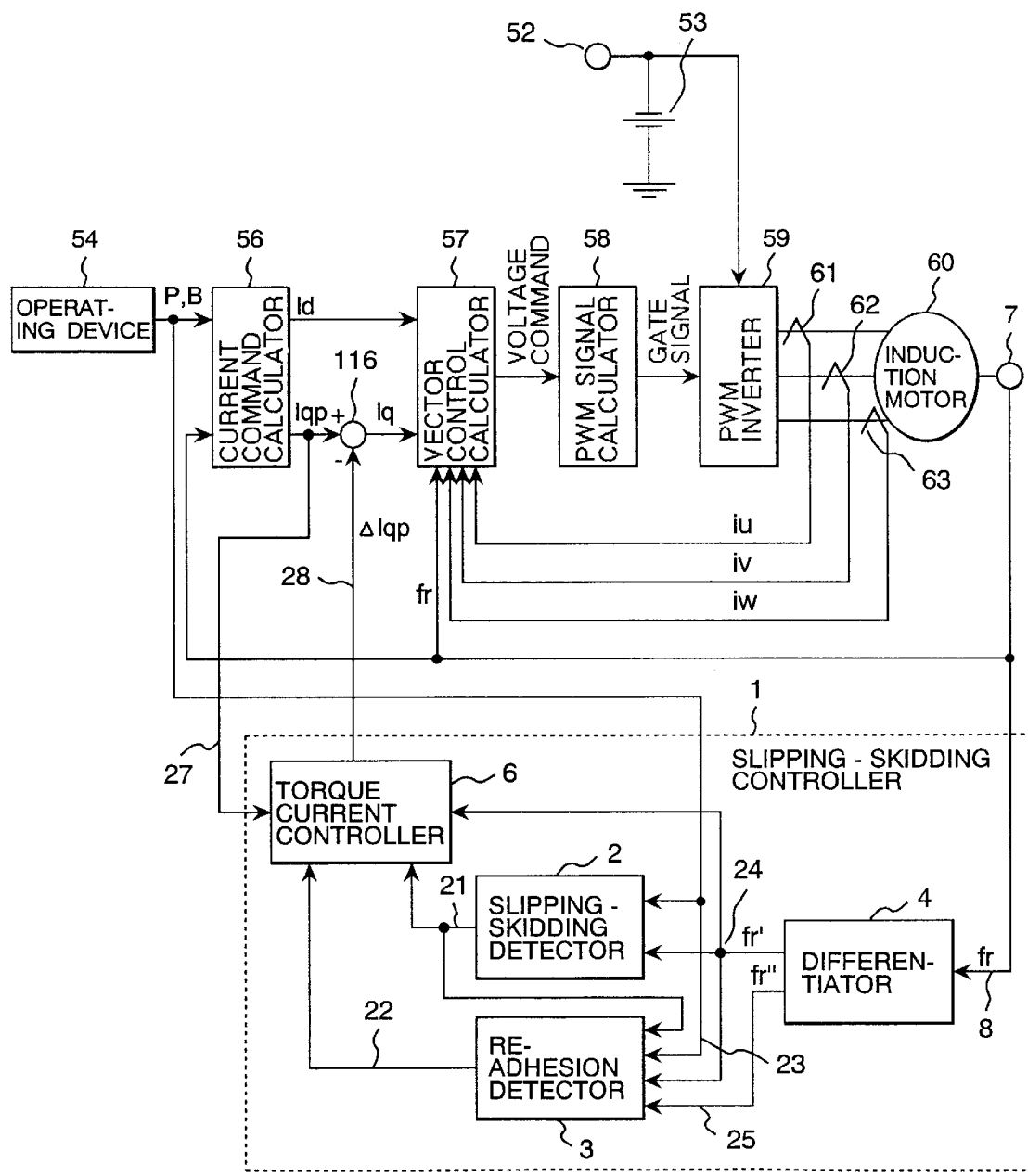
FIG. 1 is a block diagram of the controller indicating an embodiment of the present invention.

Hereinafter, an embodiment of the present invention is explained referring to figures. FIG. 1 is a block diagram indicating an outline of a control composition in a controller of electric vehicles, wherein induction motors are driven by converting a direct current to an alternate current with a vector control inverter. Although each of the blocks in FIG. 1 is indicated by a name of the apparatus for facilitating the explanation of the present invention, the block can be a software for microcomputer which treats the functions depending on necessity.

In accordance with FIG. 1, a driving command P, or a braking command B output from the operating device 54, and a signal 8 on a rotor frequency fr obtained by a rotation velocity detector 7 connected to the induction motor 60 are input into a current command calculator 56; and an exciting current command Id and a current pattern Iqp are generated. A torque current command Iq is calculated by a subtracter 116 from a difference between the Iqp and a torque current control value ΔIqp obtained from a slipping-skidding controller 1. The Iq, the rotor frequency fr, and motor current detected values, iu, iv, and iw obtained by current detectors 61, 62, and 63 are input into a vector control calculator 57; and a voltage command for output voltage of the inverter is generated. In accordance with a PWM signal calculator 58, a PWM signal is generated by comparison of the voltage command with a carrier of chopping wave which is not shown in the figure, and the PWM signal is output as a gate signal. A PWM inverter 59 operates switching elements composing a main circuit with the gate signal; a direct current obtained from a direct current power source 52 via a filter condenser 53 is converted to three phase alternate current electric power; and the electric power is supplied to the induction motor 60.

The wheels of the electric vehicle (not shown in the figure) are driven by the above induction motor, and the wheel velocity and the rotation velocity of the induction motor are in a proportional relationship. Details of composition and operation of the above calculators 56, 57, 58 and the PWM inverter 59 are disclosed in JP-A-5-83976 (1993), and are not described herewith. The present invention is based on a premise that the electric vehicles driven by the vector control PWM inverter having a composition described above is controlled.

Next, referring to FIG. 1, the composition of the slipping-skidding controller 1, which is the present invention, is explained. Its details are explained referring to FIG. 2–FIG. 5. The controller 1 comprises a differentiator 4, a slipping-skidding detector 2, a re-adhesion detector 3, and a torque current controller 6. The differentiator 4 calculates a differential value fr', which is a changing rate with time of the signal 8 of the rotor frequency fr obtained by the rotation velocity detector 7, and a twice differential value fr" which is a changing rate with time of the fr'. The slipping-skidding detector 2 detects the slipping or skidding from the driving command P and braking command B, which are output from the operating device 54, based on the signal 24 of the differential value fr', and outputs the detecting signal 21. The re-adhesion detector 3 detects the re-adhesion of wheel and rail based on the slipping-skidding detecting signal 21, P and B command signals 23 from the operating device 54, and the fr' and fr" signals 24, 25 from the differentiator 4; and the re-adhesion detecting signal 22 is output. The torque current controller 6 calculates the torque current control value ΔIqp based on the slipping-skidding detecting signal 21, the re-adhesion detecting signal 22, a signal 27 on the torque current pattern Iqp from the current command calculator 56, and the fr' signal 24.

Figure 2:
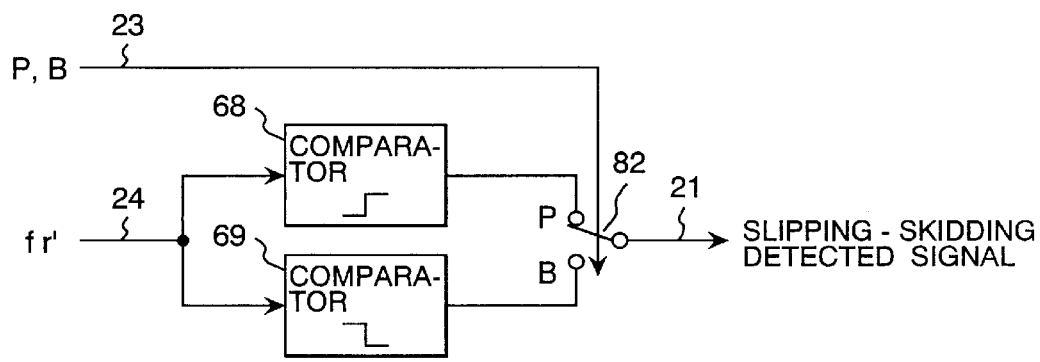
FIG. 2 is an illustration indicating a detailed composition of a slipping-skidding detector 2 shown in FIG. 1.

FIG. 2 indicates an example of practical composition of the slipping-skidding detector 2. The detector comprises comparators 68, 69 and a switch 82. The signal 24 of the differential value fr' is input into respective of the comparators 68, 69. If the differential value fr' is larger than a designated value, the comparator 68 outputs "1", and if the differential value fr' is smaller than a designated value, the comparator 69 outputs "1". The switch 82 is switched to P side when the driving command P is output in the command signal 23 from the operating device 54, the output from the comparator 68 is output as the slipping-skidding detecting signal 21; the switch 82 is switched to B side when the braking command B is output, and the output from the comparator 69 is output as the slipping-skidding detecting signal 21. Generally, the detecting level of the comparator 68 is set at approximately 1.5–2 times of the maximum acceleration (a positive value), and the detecting level of the comparator 69 is set at approximately 1.5–2 times of the maximum deceleration (a negative value). In accordance with the above composition, slipping or skidding can be detected, because when the slipping is generated, the differential value fr' of the rotor frequency fr is increased, and the differential value fr' of the rotor frequency fr is decreased when the skidding is generated.

Figure 3:
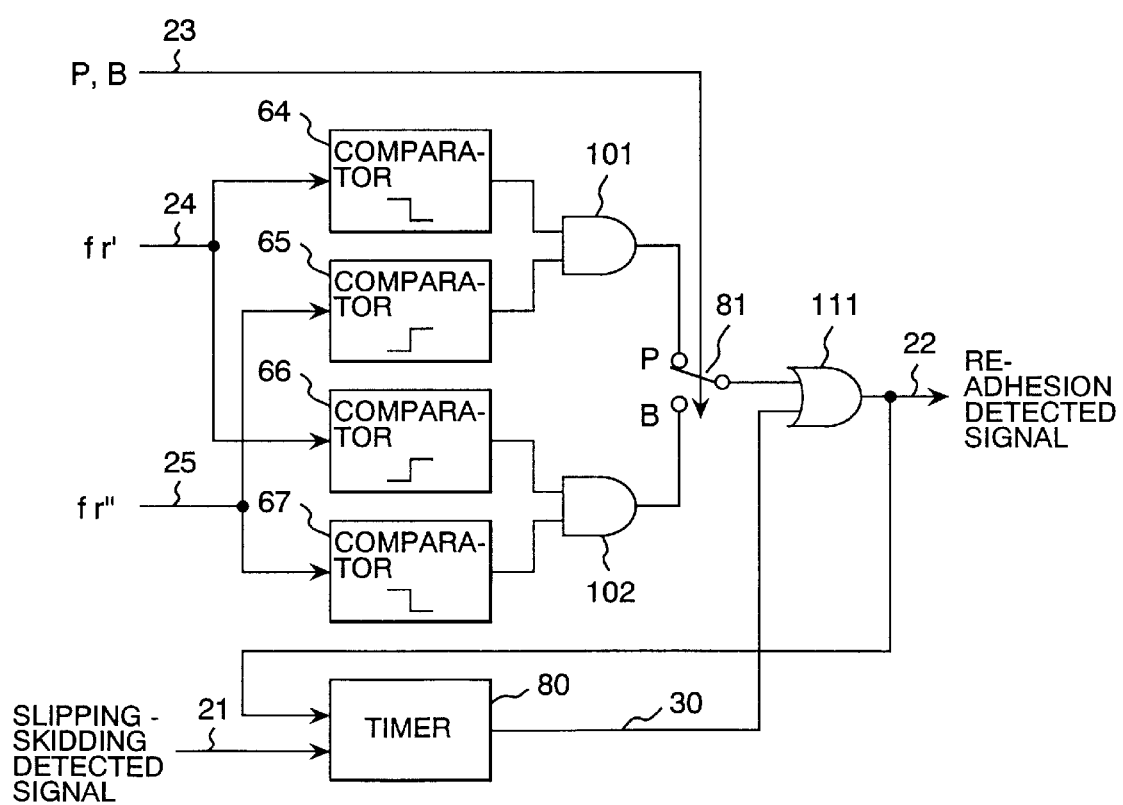
FIG. 3 is an illustration indicating a detailed composition of a re-adhesion detector 3 shown in FIG. 1.

FIG. 3 indicates an example of practical composition of the re-adhesion detector 3. The detector 3 comprises comparators 64–67, AND-circuits 101, 102, a switch 81, an OR-circuit 111, and a timer 80. First, as the detection of re-adhesion after slipping, a signal 24 on the differential value fr' is input into the comparator 64, and a signal 25 on the twice differential value fr" is input into the comparator 65. The comparators are set so that the comparator 64 outputs "1" when the fr' signal 24 is smaller than a designated value, and the comparator 65 outputs "1" when the fr" signal 25 is larger than a designated value. The AND-circuit 101 takes a logical product from the both comparators, and outputs a signal whether the re-adhesion occurs or not after the slipping based on the logic product. That is, because when the re-adhesion occurs after slipping has been once generated, a condition is achieved that the differential value fr' of the rotor frequency fr becomes negative, and the twice differential value fr" becomes positive.

On the other hand, the re-adhesion after skidding is detected by inputting a signal 24 on the differential value fr' into the comparator 66, and a signal 25 on the twice differential value fr" into the comparator 67. The comparators are set so that the comparator 66 outputs "1" when the fr' signal 24 is larger than a designated value, and the comparator 67 outputs "1" when the fr" signal 25 is smaller than a designated value. The AND-circuit 102 takes a logical product from the both comparators, and outputs a signal whether the re-adhesion occurs or not after the skidding based on the logic product. That is, because when the re-adhesion occurs after skidding has been once generated, a condition is achieved that the differential value fr' of the rotor frequency fr becomes positive, and the twice differential value fr" becomes negative.

The switch 81 is switched to P side when the driving command P is in the command signal 23 from the operating device 54, and is switched to B side when the braking commandB is in the command signal 23. During the driving, the output from the AND-circuit 101 is inputs into the OR-circuit 111, and during the braking, the output from the AND-circuit 102 is inputs into the OR-circuit 111, and the re-adhesion detecting signal 22 after slipping, or skidding, respectively, is output.

An output from the timer 80 is input into the OR-circuit 111 as another input. When the vehicle passes on a junction of rails or a point of switch, slipping or skidding can be detected erroneously, and sometimes the re-adhesion can not be detected. The above composition is a countermeasure for responding the above case. That is, if the re-adhesion can not be detected, the torque of the induction motor is reduced continuously notwithstanding slipping or skidding is not generated. Therefore, the slipping-skidding detecting signal 21 and the re-adhesion detecting signal 22 are input into the timer 80, and if the re-adhesion is not detected during a designated time after the slipping or skidding is detected, the re-adhesion is regarded as being generated, and the re-adhesion signal is output from the timer 80 via the OR-circuit 111.

Figure 4:
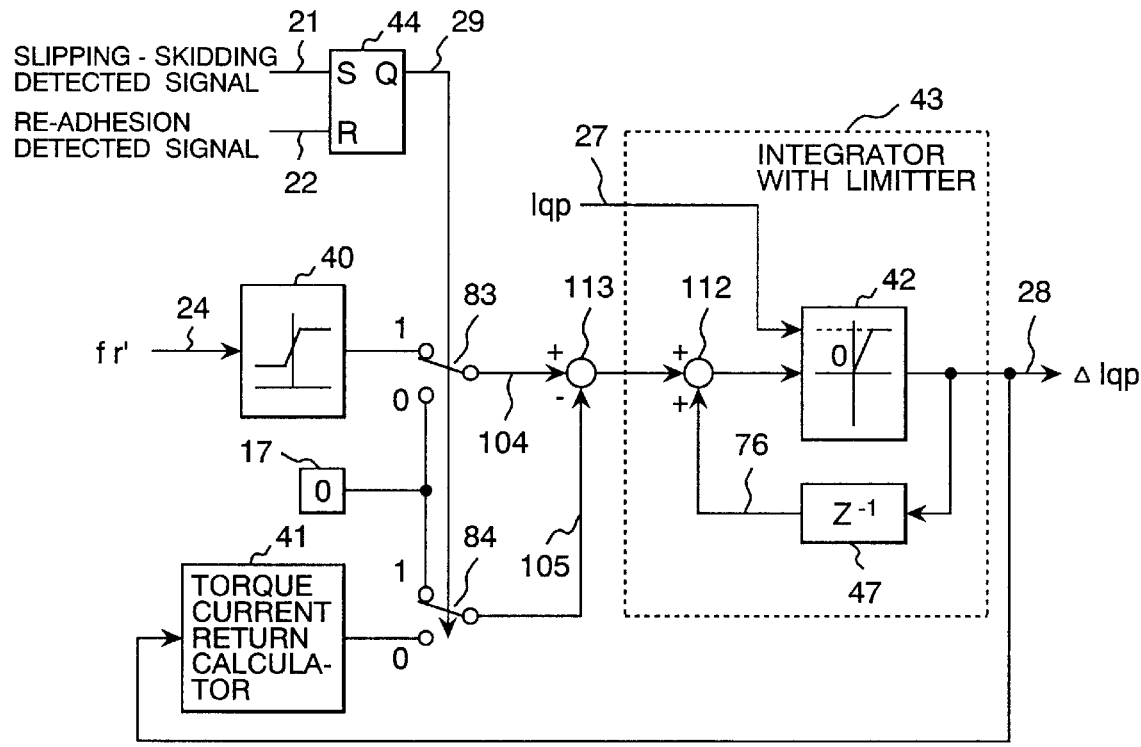
FIG. 4 is an illustration indicating a detailed composition of a torque current controller 6 shown in FIG. 1.

FIG. 4 in dictates a practical composition and functions of the torque current controller 6. At a flip-flop 44, once the slipping-skidding detecting signal 21 becomes "1", the slipping-skidding detecting signal 21 is kept at "1" until the re-adhesion signal 22 becomes "1". During t he slipping-skidding detecting signal 21 is kept at "1", that is, during slipping or skidding, switches 83, 84 are switched to "1" side, and a function generator 40 outputs a designated value depending on the signal 24 of the differential value fr' of the rotor frequency to a subtracter 113. At that time, since the switch 84 is switched to the "1" side, a difference input value 105 of the subtracter 113 is "0". Accordingly, the output from the function generator 40 is input into an integrator with limiter 43 without any change. At the integrator with limiter, the output from the function generator 40 is added to the output from a holder 47 for obtaining an integrated value. The integrated value is limited to a value less than the torque current pattern Iqp and larger than "0" by the limiter 42, and is output as an amount of the torque current control ΔIqp. That means, during a period from the slipping-skidding detecting signal 21 becomes "1" to the re-adhesion signal detecting signal 22 becomes "1", ΔIqp is increased, and the torque of the induction motor is decreased. Then, when the re-adhesion detecting signal 22 becomes "1", the slipping-skidding detecting signal 21 becomes "0"; the switches 83, 84 are switched to the "0" side; a torque current return calculator 41 outputs a designated value depending on the amount of the torque current control ΔIqp, which is input into the subtracter 113 as the difference input value 105. At that time, since the switch 83 is switched to the "0" side, a sum input value 104 of the subtracter 113 is "0". Accordingly, the output from the torque current return calculator 41 is input into an integrator with limiter 43 as a negative value. As a result, an adder 112 reduces the integrated value by subtracting the output from the torque current return calculator 41 from a previous value obtained by the holder 47, and an amount of the torque current controlΔIqp, which is limited to a value larger than "0", is output. The function generator 40 can generate a constant value irrelevant to the signal 24 of fr'.

Figure 5:
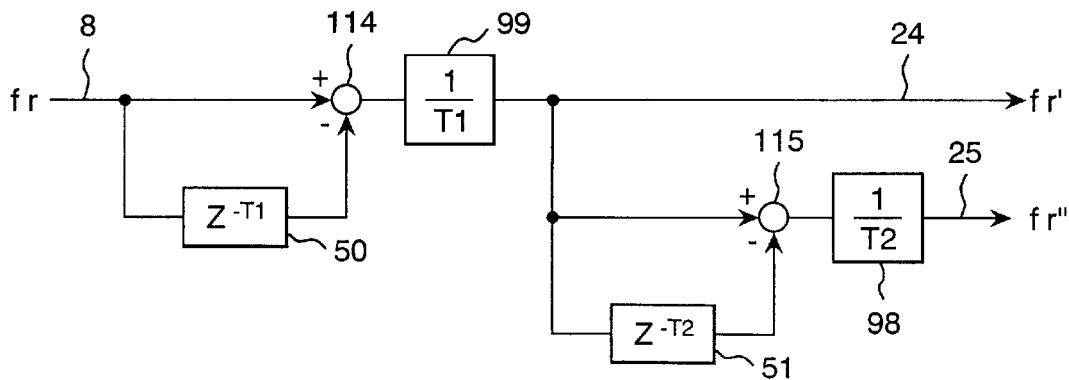
FIG. 5 is an illustration indicating a detailed composition of a differentiator 4 shown in FIG. 1.

FIG. 5 indicates a practical composition of the differentiator 4. The subtracter 114 calculates a difference between the rotor frequency fr at the time and the rotor frequency fr before a time T1 second held by the holder 50; converts its output to a changing amount of rotor frequency per second by multiplying with 1/T1 by a multiplier 99; and outputs as a signal 24 of the differential value fr' (equivalent to a changing rate with time of the rotor frequency) of the rotor frequency. Furthermore, a difference between the signal 24 of fr' and the fr' before a time T2 second held by the holder 51 is calculated by the subtracter 115; converts the difference to a changing amount of fr' per second by multiplying with 1/T2 by a multiplier 98; and outputs as a signal 25 of the twice differential value fr" (equivalent to a changing rate of a changing rate with time of the rotor frequency) of the rotor frequency.

Figure 6:
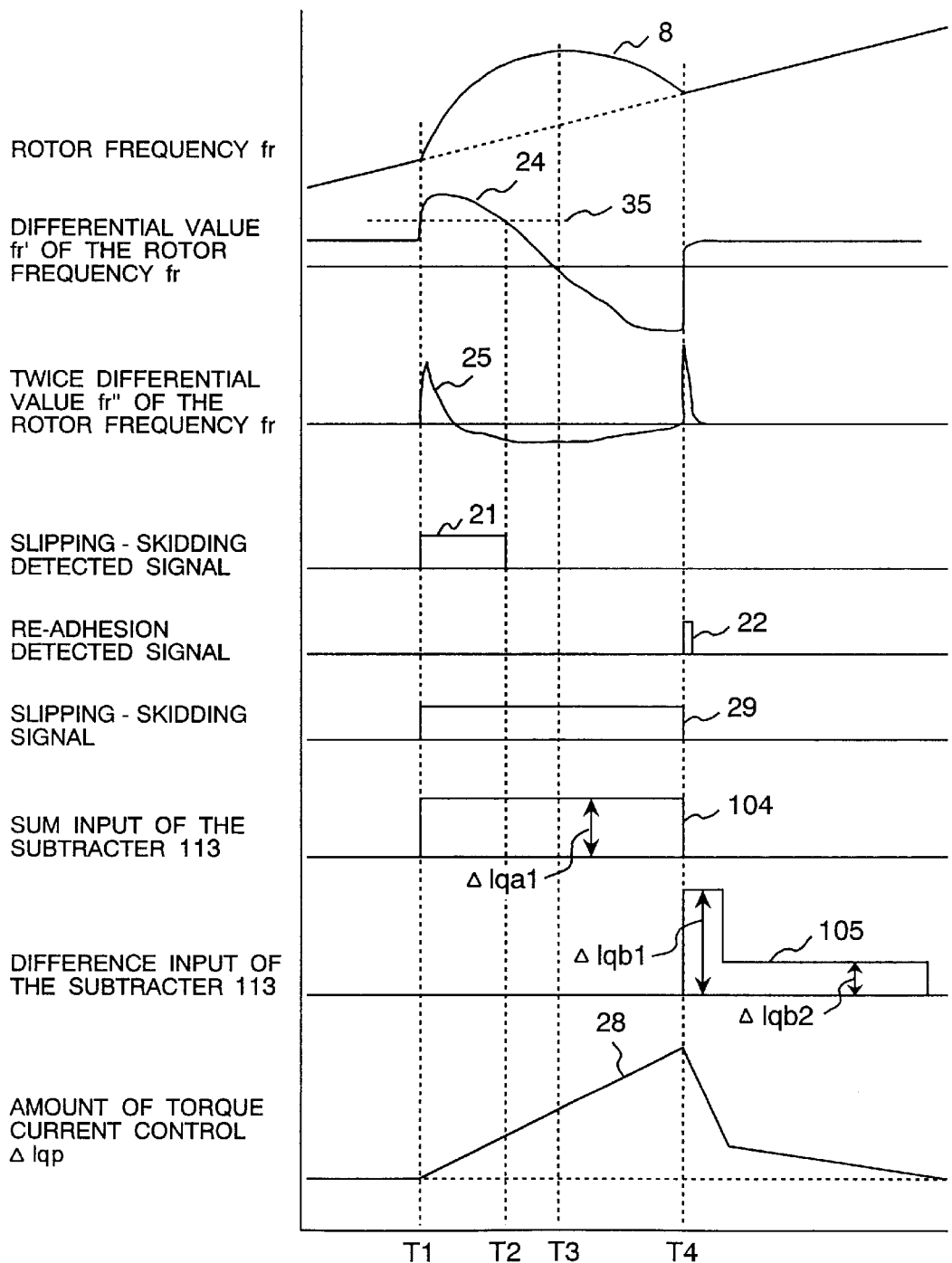
FIG. 6–FIG. 8 are figures for explaining operations of the present invention.
Figure 7:
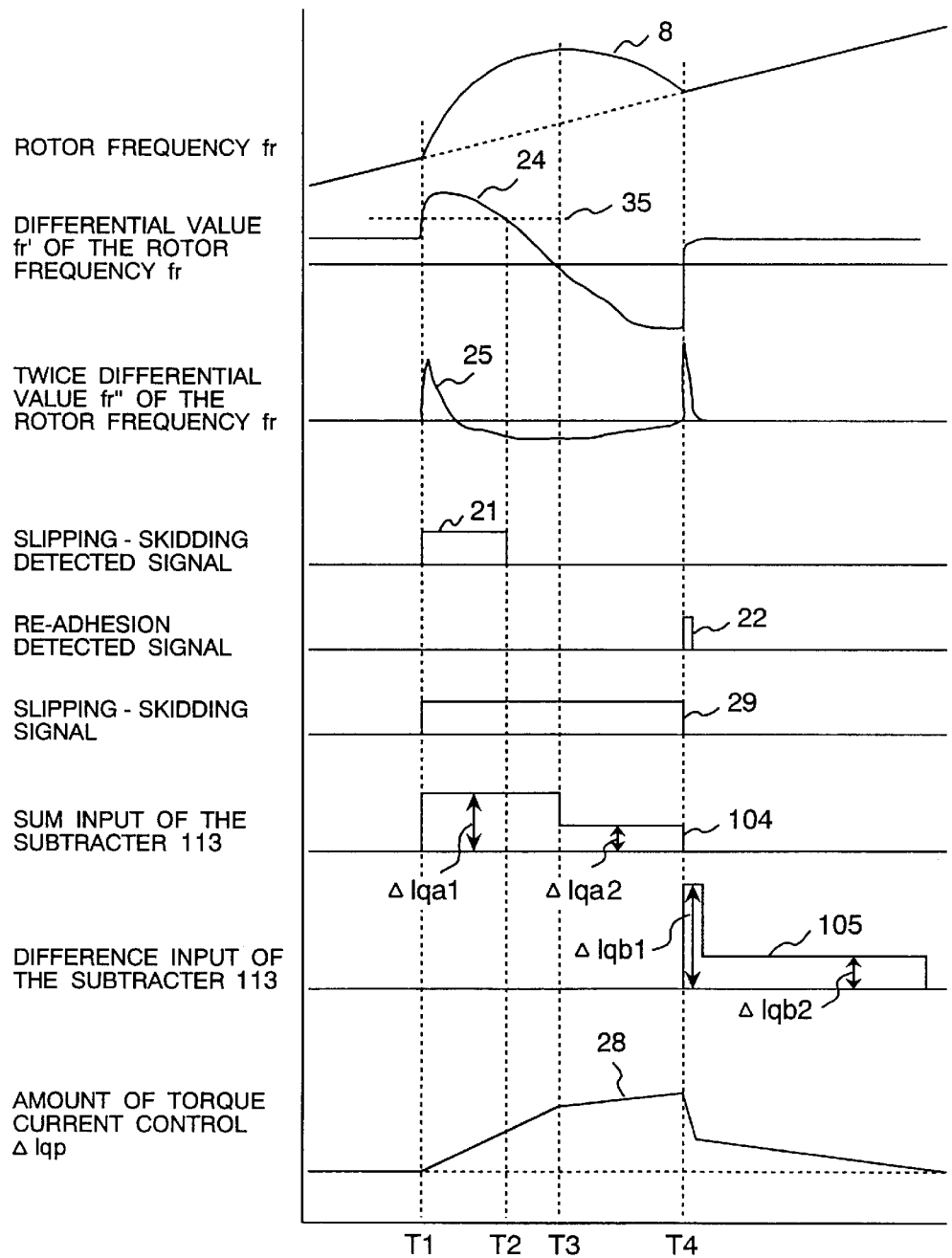
Figure 8:
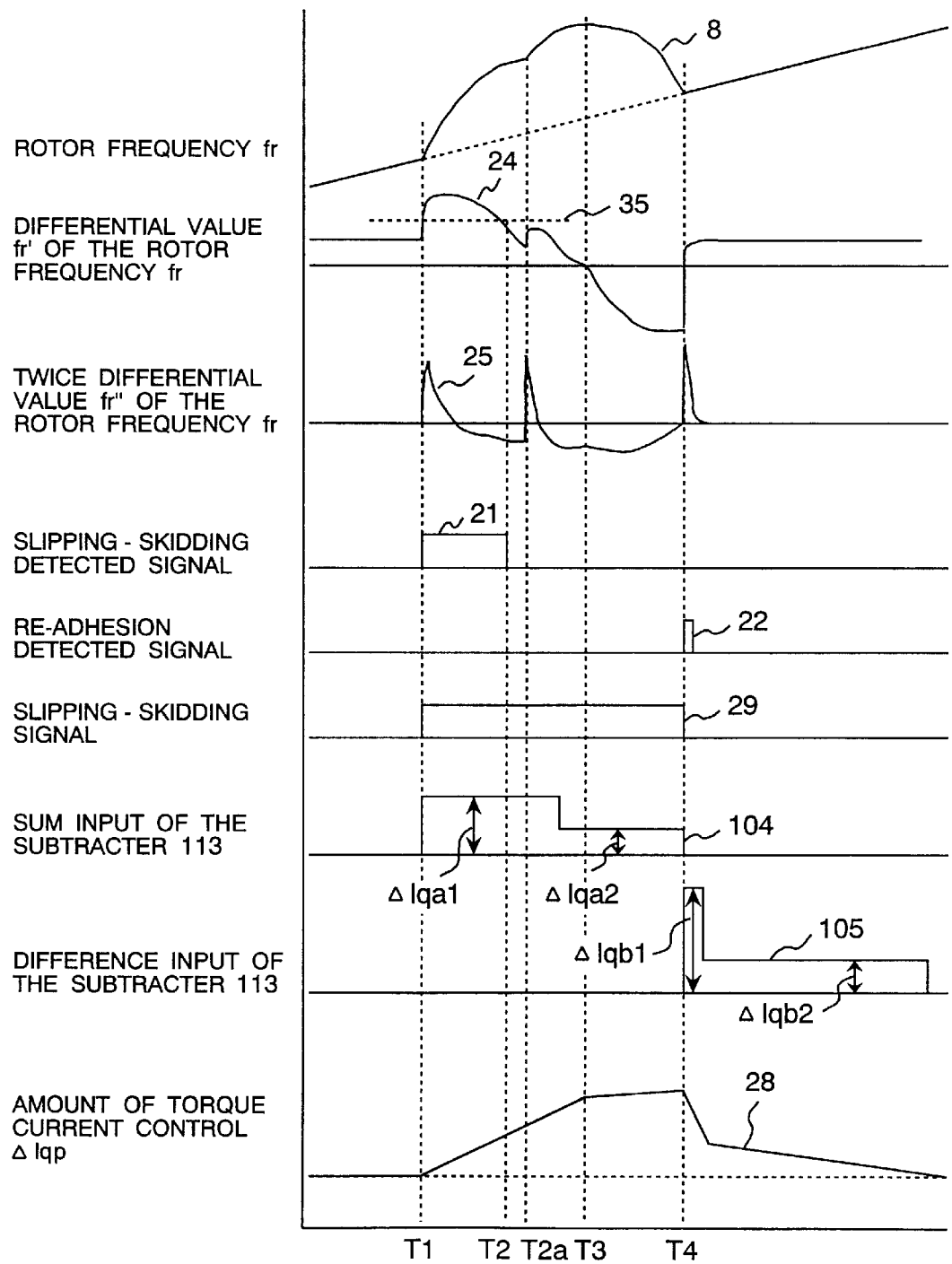

Next, an operation in the embodiment of the present invention indicated in FIG. 1 is explained referring to FIG. 6–FIG. 8 on a case when slipping is generated. FIG. 6 indicates an example of operation in a case when the function generator 40 indicated in FIG. 4 output a fixed value irrelevant to the differential value fr' of the rotor frequency. In accordance with FIG. 6, when the rotor frequency is increased rapidly by generating slipping at the time T1, the differential value of the rotor frequency fr' is increased rapidly. When the fr' exceeds a detecting level 35, the slipping-skidding detecting signal 21 becomes "1"; the slipping-skidding signal 29 is held at "1", and if the slipping-skidding detecting signal 21 becomes "0" at the time T2, the slipping-skidding signal 29 is kept at "1". During a period when the slipping-skidding signal 29 is kept at "1", the function generator 40 indicated in FIG. 4 outputs a designated value, and a sum input value 104 of the subtracter 104 becomes a fixed value ΔIqa1. Therefore, the amount of torque current control ΔIqp is increased with a fixed gradient so that the wheel and rail come to be re-adhered by reducing the torque of the induction motor. When the wheel and the rail are re-adhered at the time T4, the signal 24 of fr' changes from negative to positive, and the signal 25 of fr" becomes a positive value. Therefore, at that time, a condition that fr' is negative and fr" becomes positive is achieved; the re-adhesion detecting signal 22 becomes "1", and the slipping-skidding signal 29 becomes "0". When the slipping-skidding signal 29 becomes "0", the torque current return calculator 41 generates an output corresponding to the amount of the torque current control ΔIqp. In accordance with FIG. 6, it is the case when the output from the torque current return calculator 41 is changed from ΔIqb1 to ΔIqb2, the amount of the torque current control ΔIqp is changed by two steps to resume the torque of the induction motor. Because the torque of the induction motor can be resumed rapidly by detecting the re-adhesion as explained above, the torque of the induction motor can be utilized effectively.

FIG. 7 indicates an example of operation in a case when the function generator 40 shown in FIG. 4 outputs a value corresponding to the differential value fr' of the rotor frequency. During the time from T1 to T3, when the fr' is positive, ΔIqa1 is output, and during the time from T3 to T4, when the fr' is negative, ΔIqa1 is output (ΔIqa1>ΔIqa2). As the result, increase of the amount of torque current control ΔIqp is suppressed after the time T3. However, at the time T3, fr' changes from positive to negative. Because it indicates that the slipping is converging to an end, even if the increase rate of the amount of torque current control ΔIqp is suppressed in comparison with the initial period of the slipping, the wheel and the rail are going to re-adhere, and are adhered at the time T4. As explained above, the amount of the torque current control ΔIqp is not increased more than its necessity when the slipping is started to converge to an end by changing the amount of the torque current control corresponding to fr'. Accordingly, the torque utilization fraction of the induction motor can be increased more than the case of FIG. 6, because the integrated value of the ΔIqp can be suppressed at the minimum. If the apparatus is set so as to obtain the operation pattern indicated in FIG. 7, fluctuation of the torque of the induction motor can be reduced, because the maximum value of the ΔIqp can be smaller than that in FIG. 6, and a riding quality can be improved.

Figure 12:
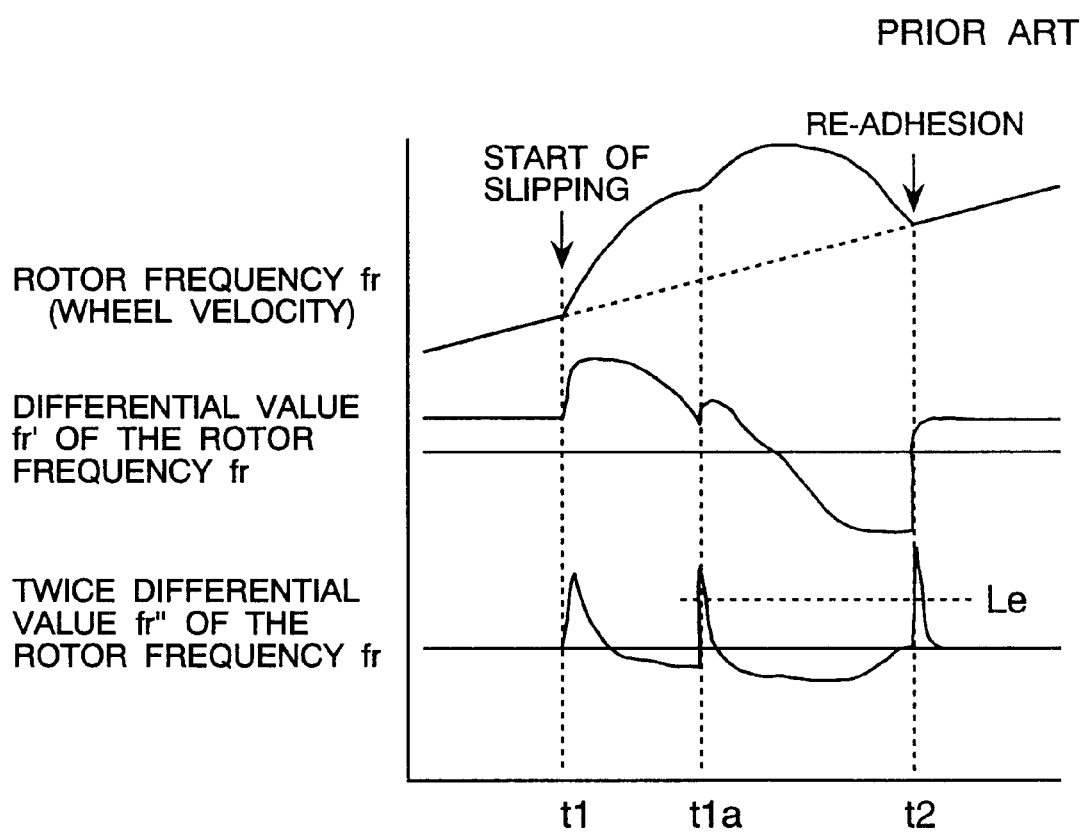

FIG. 8 indicates an example of operation in a case that, after slipping has started once to converge to an end, the slipping is resumed to expand again (this case corresponds to the slipping condition shown in FIG. 12 of the prior art). In accordance with FIG. 8, when the slipping is resumed to expand again at the time T2a after the slipping has started once to converge to an end, the fr" becomes positive. However, as previously explained relating to FIG. 3, the present invention detects the re-adhesion when the slipping is generated by detecting the condition that fr' is negative and fr" becomes positive. Because the fr' is positive at the time T2, the re-adhesion can not be detected erroneously. In accordance with the present invention, the re-adhesion can be detected exactly at the time T4 as well as the case shown in FIG. 6, even if the slipping of the above case is generated.

Although it is not shown in FIG. 6–FIG. 8, if the slipping or skidding is generated again, and the slipping-skidding signal 21 becomes "1" during a process when the re-adhesion detecting signal 22 becomes "1", and the torque of the induction motor is resumed by reducing the amount of the torque current control A Iqp; the amount of the torque current control ΔIqp at the time is taken as the initial value, and the amount of the torque current control ΔIqp is increased to operate the apparatus to come to re-adhere.

Figure 9:
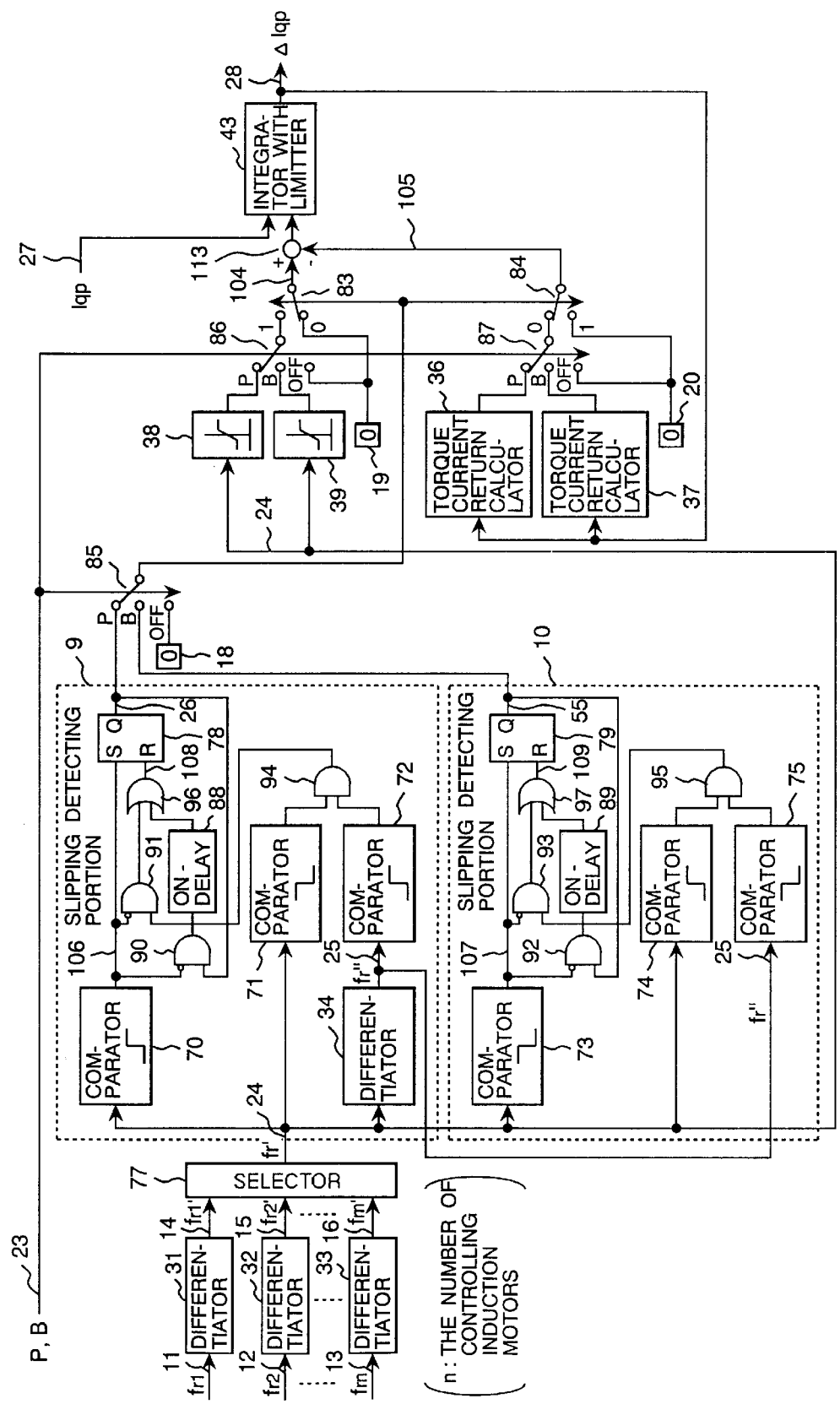
FIG. 9 is a block diagram of the controller indicating the second embodiment of the present invention.
Figure 10:
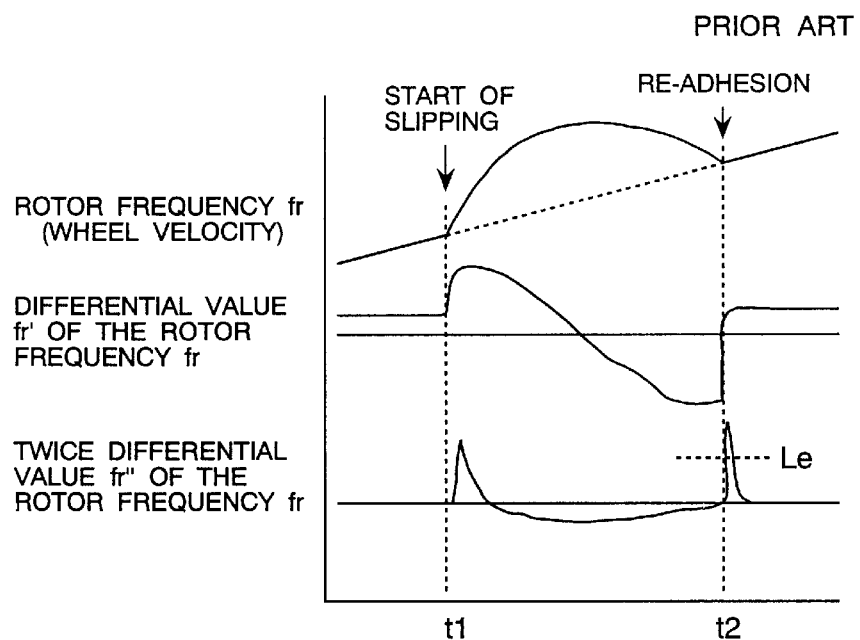
FIG. 10–FIG. 12 are figures for explaining operations of the prior art.
Figure 11:
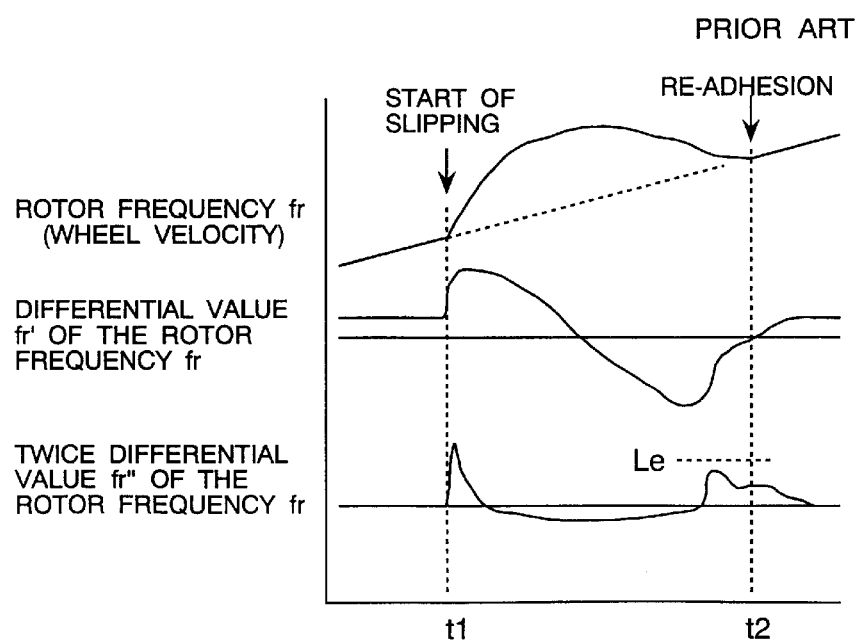

In accordance with the embodiment of the present invention indicated in FIG. 1, a case when a motor is driven by an inverter has been indicated. However, in another case, plural motors are provided at respective wheel axes in an electric vehicle, and the plural motors are driven by an inverter. FIG. 9 indicates the second embodiment of the present invention, which is an example wherein the present invention is applied to a controller which controls plural induction motors. Rotor frequencies $fr_1$–$fr_n$ (n is the number of controlling induction motors) obtained by rotation speed detectors connected to each of the induction motors are differentiated respectively by differentiators 31–33 to calculate the differential values of the rotor frequencies $fr_1'$–$fr_n'$. The selector 77 selects a representative value of the ($fr_1'$–$fr_n'$), and defines it as fr'. If, for instance, the maximum value is selected as the representative value during the driving operation, and the minimum value is selected as the representative value during the braking operation, it becomes possible to detect slipping or skidding of only one axis.

The selected fr' signal 24 is input into the slipping detector 9 and the skidding detector 10, respectively, and slipping and skidding are detected. Hereinafter, the operation when slipping is generated during the driving operation is explained. If fr' signal 24 exceeds a designated value at the slipping detector 9, the comparator 70 detects the slipping, the slipping detecting signal 106 becomes "1", and the slipping signal 26, which an output from the flip-flop 78, is maintained by "1". At that time, the output from the switch 85 becomes "1", because the switch 85 is at the P side, and the switches 83, 84 select the "1" side, respectively. Since the switch 86 has been selecting the P side, the output from the function generator 38 corresponding to the fr' signal 24 is input into the subtracter 113 via the switch 86—switch 83. Since then, the input is integrated by the integrator with limiter 43 as same as the case shown in FIG. 4, and output as the amount of torque current control ΔIqp.

When the wheel and the rail are re-adhered, a condition, wherein fr' is negative and fr" is positive, is achieved. Then, the comparator 71 outputs "1" when fr' is negative by setting the detecting level of the comparator 71 at approximately zero. The twice differential value fr", which can be obtained by differentiating fr' by the differentiator 34, is input into the comparator 72. When the fr" is positive, the comparator 72 outputs "1" by setting the detecting level of the comparator 72 at approximately zero. Therefore, when re-adhered, the output of the AND circuit 94 becomes "1", and the output of the AND circuit 91 becomes "1", because the output of the comparator 70 is "0" at the time. Then, the output from the OR circuit 96 becomes "1", and re-adhesion detecting signal 108 becomes "1". Therefore, slipping signal 26 becomes "0", the switches 83, 84 select the "0" side, respectively, and the output from the torque current return calculator 36 becomes negative at the subtracter 113. The negative value is input into the integrator with limiter 43, and the amount of torque current control ΔIqp is reduced to resume the torque of the induction motor. If slipping is generated again during the torque resuming process, the above operations are repeated to operate so as to re-adhere the wheel and the rail. When the vehicle passes on a junction of rails, or a point of switch, a case wherein fr' 24 becomes a large value instantaneously, the output from the comparator 70 becomes "1" momentarily, and the slipping signal 26 is maintained at "1" can be assumed. However, when the slipping is erroneously detected as the above case, the condition of the re-adhesion, that is, fr' is negative and fr" is positive can not be sometimes achieved. In a case of such an erroneous detection, the output from the comparator 70 becomes "0" immediately, the output from the AND circuit 90 becomes "1" at the moment, and the on-delay 88 starts counting and, after a designated time passes, outputs a signal "1" to make the re-adhesion detecting signal 108 "1". As explained above, the setting time of the on-delay 88 can be short as approximately hundreds milliseconds by making the on-delay 88 start operation at the time when the output from the comparator becomes "0". Therefore, because the re-adhesion can be detected immediately even if the slipping is detected erroneously, lowering the torque utilization rate can be suppressed at the minimum. When skidding is generated during braking period, a skidding detector 10 detects the skidding, and calculates the amount of torque current control ΔIqp as same as the case of the above slipping. The embodiment indicated in FIG. 9 differs from the first embodiment in its composition relating to points that plural control devices are used for controlling induction motors, the function generators and the torque current return calculators are used separately for slipping and skidding, respectively, and others. However, its operation is as same as indicated in FIG. 6–FIG. 8.

In accordance with the present invention, the re-adhesion point can be certainly detected when a wheel generates slipping or skidding, and the torque current component of motor can be resumed rapidly by utilizing the fast response of vector control. Accordingly, since the torque can be utilized effectively to a physical adhesion limit even in a condition where the adhesion coefficient is low such as a rainy day, acceleration and deceleration of the electric vehicle can be increased as much as possible.

Therefore, the present invention is suitable for utilizing in controlling electric vehicles of railway, wherein slipping and skidding are generated frequently. Furthermore, the present invention is suitable for electric automobiles, if the applying range of the present invention is extended broadly.

What is claimed is:

1. A controller for electric vehicles comprising a vector control inverter for controlling motors, which drive wheels of the electric vehicles, by dividing the primary current of the motors into an exciting current component and a torque current component, and controlling respective of the current components based on a respectively designated command, further comprises;

means for detecting a wheel velocity including a rotor frequency of the motor proportional to the wheel velocity, and means for adjusting said designated command for the torque current component based on a differential value and a twice differential value of the detected wheel velocity.

2. A controller for electric vehicles comprising a vector control inverter for controlling motors, which drive wheels of the electric vehicles, by dividing the primary current of the motors into an exciting current component and a torque current component, and controlling respective of the current components based on a respectively designated command, further comprises;

means for detecting a wheel velocity including a rotor frequency of the motor proportional to the wheel velocity, and means for adjusting said designated command for the torque current component based on a differential value of the detected wheel velocity and an inflection point of said differential value.

3. A controller for electric vehicles comprising a vector control inverter for controlling motors, which drive wheels of the electric vehicles, by dividing the primary current of the motors into an exciting current component and a torque current component, and controlling respective of the current components based on a respectively designated command, further comprises;

means for detecting a wheel velocity including a rotor frequency of the motor proportional to the wheel velocity, means for detecting slipping and skidding of the wheel based on a differential value of the detected wheel velocity, means for detecting re-adhesion of the wheel based on the differential value and a twice differential value of the detected wheel velocity, and means for adjusting said designated command for the torque current component in response to said two detecting means.

4. A controller for electric vehicles as claimed in claim 3, wherein said means for detecting slipping and skidding of wheel detects the slipping by detecting a differential value of the detected wheel velocity larger than a positive designated value during an accelerating command is given to the electric vehicle, and by detecting a differential value of the detected wheel velocity smaller than a negative designated value during a decelerating command is given to the electric vehicle.

5. A controller for electric vehicles as claimed in claim 3, wherein said means for detecting re-adhesion of wheel detects the re-adhesion by detecting a negative differential value and a positive twice differential value of the detected wheel velocity during an accelerating command is given to the electric vehicle, and by detecting a positive differential value and a negative twice differential value of the detected wheel velocity during a decelerating command is given to the electric vehicle.

6. A controller for electric vehicles as claimed in any one of claims 3–5, wherein said means for adjusting said designated command for the torque current component adjusts said designated command by decreasing an absolute value from a standard value of said designated command for the torque current component during a period from detecting the slipping and skidding to detecting the re-adhesion of the wheel, and resuming said standard value of said designated command for the torque current component after detecting the re-adhesion of wheel.

7. A controller for electric vehicles as claimed in claim 6, wherein the decreasing amount of said absolute value from a standard value of said designated command for the torque current component is varied in response to the differential value of the wheel velocity at the time.

8. A controller for electric vehicles as claimed in claim 6, further comprises;

means for assuming generation of the re-adhesion if any re-adhesion detected signal is not output from said means for detecting re-adhesion of wheel when a designated time is elapsed since the slipping-skidding detected signal has been output from said means for detecting slipping-skidding of wheel.

9. A controller for electric vehicles as claimed in claim 6, further comprises;

means for assuming generation of the re-adhesion if any re-adhesion detected signal is not output from said means for detecting re-adhesion of wheel when a designated time is elapsed after finishing the output of the slipping-skidding detected signal from said means for detecting slipping-skidding of wheel.

10. A controller for electric vehicles as claimed in any one of claims 1–3, wherein said differential value of the wheel velocity is calculated from a difference of the wheel velocity at the present and before a designated time, and said twice differential value of the wheel velocity is calculated from a difference of the differential value of the wheel velocity at the present and before a designated time.

11. A re-adhesion controller for electric vehicles comprising a vector control inverter for controlling induction motors, which drive wheels of the electric vehicles, further comprises;

means for detecting a wheel velocity including a rotor frequency of said induction motor proportional to the wheel velocity, means for detecting slipping and skidding of the wheel based on a differential value of the detected wheel velocity, means for detecting re-adhesion of the wheel based on a differential value and a twice differential value of the detected wheel velocity, and means for controlling the current to the induction motor by said inverter in response to said two detecting means.

* * * * *